United States Patent
Sotek et al.

(10) Patent No.: US 6,189,059 B1
(45) Date of Patent: Feb. 13, 2001

(54) COMMUNICATIONS SYSTEM WITH A MASTER STATION AND AT LEAST ONE SLAVE STATION

(75) Inventors: Karel Sotek, Munich; Sönke Mehrgardt, Deisenhofen; Christine Born, Ottobrunn; Heinz Endriss, Stockdorf; Timo Gossmann, Munich, all of (DE)

(73) Assignee: Infineon Technologies AG, Munich (DE)

( * ) Notice: Under 35 U.S.C. 154(b), the term of this patent shall be extended for 0 days.

(21) Appl. No.: 09/170,184

(22) Filed: Oct. 13, 1998

Related U.S. Application Data

(63) Continuation of application No. PCT/DE97/00706, filed on Apr. 7, 1997.

(30) Foreign Application Priority Data

Apr. 10, 1996 (DE) ................................ 196 14 238

(51) Int. Cl.[7] .................................................. G06F 13/00
(52) U.S. Cl. ............................ 710/104; 710/10; 710/9; 710/8; 710/116
(58) Field of Search ............................ 710/9, 10, 104, 710/8, 116

(56) References Cited

U.S. PATENT DOCUMENTS

| | | | |
|---|---|---|---|
| 4,463,445 | * 7/1984 | Grimes | 710/116 |
| 5,226,123 | * 7/1993 | Vockenhuber | 710/131 |
| 5,361,005 | 11/1994 | Slattery et al. | 326/56 |
| 5,499,242 | 3/1996 | Lee et al. | 370/445 |
| 5,524,269 | * 6/1996 | Hamilton et al. | 710/9 |
| 5,787,306 | * 7/1998 | Michael | 710/9 |
| 5,805,817 | * 9/1998 | Yu et al. | 709/224 |
| 6,003,097 | * 12/1999 | Richman et al. | 710/8 |

FOREIGN PATENT DOCUMENTS

| | | |
|---|---|---|
| 0 051 332 B1 | 5/1982 | (EP) . |
| 0 221 303 A2 | 5/1987 | (EP) . |
| 2 217 561 | 11/1989 | (GB) . |

* cited by examiner

Primary Examiner—Thomas C. Lee
Assistant Examiner—Tammara Peyton
(74) Attorney, Agent, or Firm—Herbert L. Lerner; Laurence A. Greenberg; Werner H. Stemer

(57) ABSTRACT

The operation of any desired number of initially unidentified slave stations in a communications system is possible. An identification procedure with a subsequent address assignment is carried out by a master station M, in that all the slave stations simultaneously output bit by bit, via open-drain output circuits OC, individual identification codes ID which are stored in them.

2 Claims, 5 Drawing Sheets

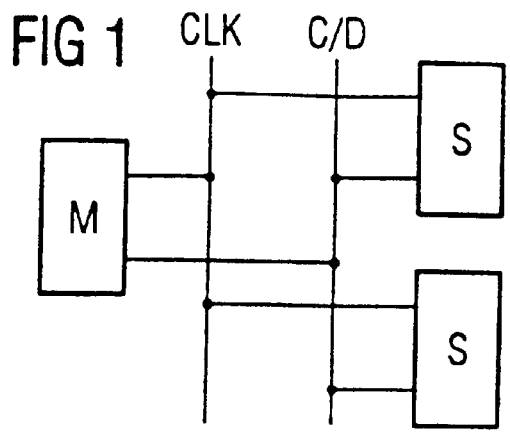
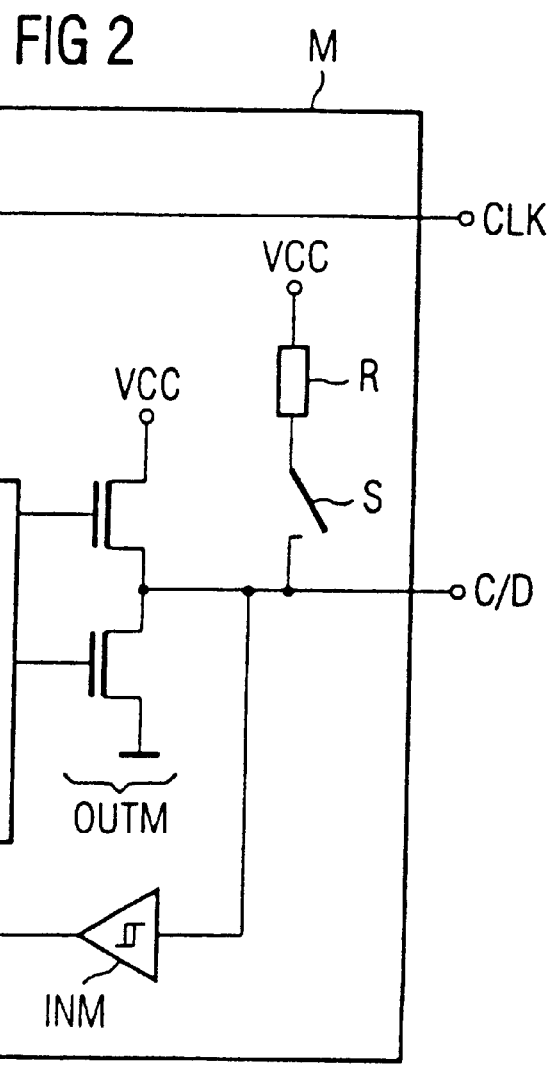

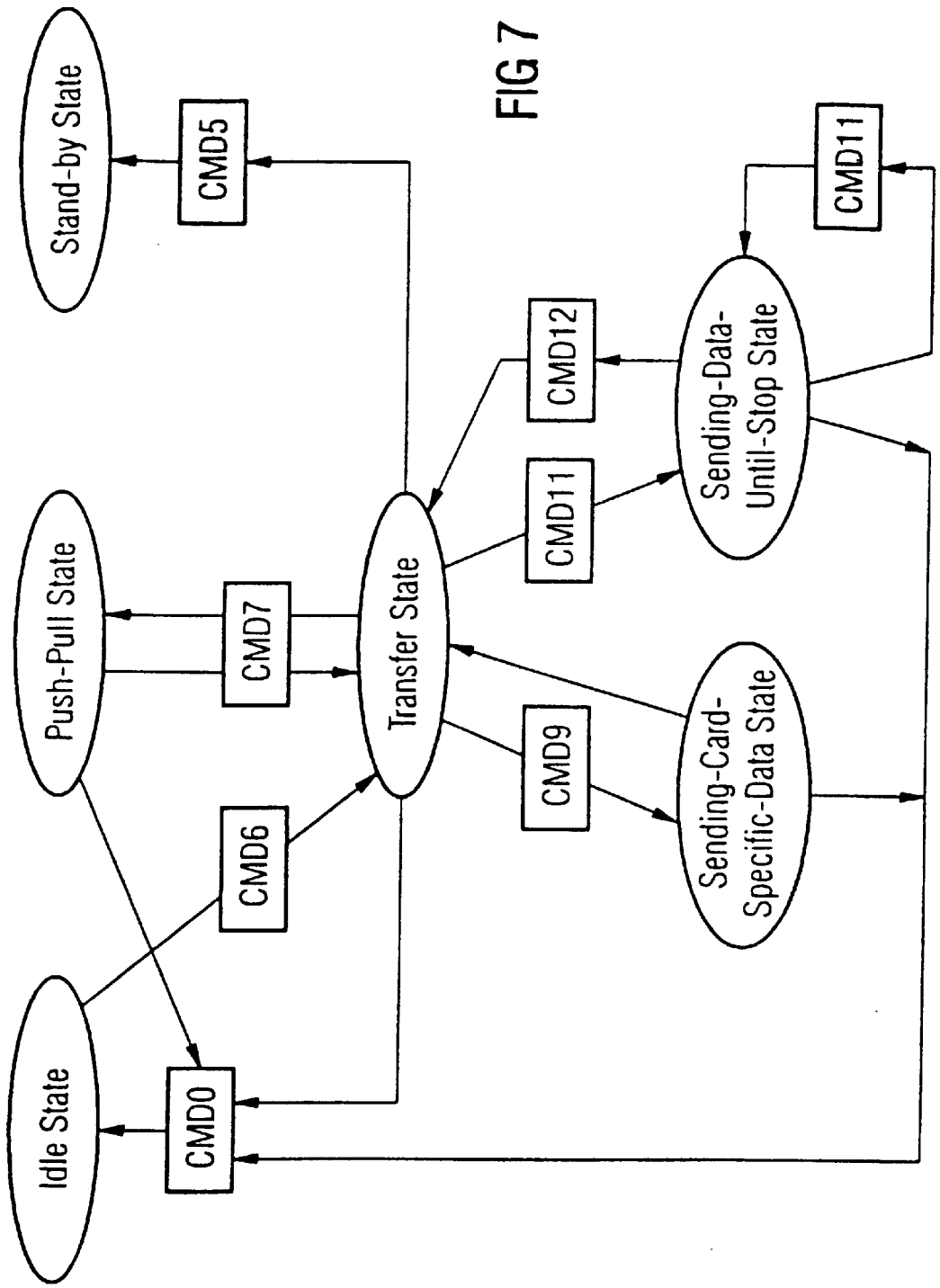

COMMUNICATIONS SYSTEM WITH A MASTER STATION AND AT LEAST ONE SLAVE STATION

CROSS-REFERENCE TO RELATED APPLICATION

This is a continuation of copending International Application PCT/DE97/00706, filed Apr. 7, 1997, which designated the United States.

BACKGROUND OF THE INVENTION

1. Field of the Invention

The invention relates to a communications system that has at least one slave station and one master station to control it. The slave stations cannot operate without the master station.

A communications system can be realized, for example, by the Inter IC ($I^2C$) bus. A plurality of master stations and a plurality of slave stations are connected to the $I^2C$ bus via open-collector outputs. The master stations control the slave stations using addresses which are known to them and which are permanently stored in the slave stations.

It is possible, in the case of the $I^2C$ bus, for two master stations simultaneously to attempt to access the bus in order to address slave stations. For this case, a so-called arbitration procedure is provided for the $I^2C$ bus. In this procedure, the competing master stations simultaneously transmit bit by bit in each case one individual identification code, stored in them, onto a pre-charged line of the bus via their open-collector outputs. The potential of the line is drawn to earth as soon as one of the bits which is about to be output has a high level, even if the bit of the other master station has a low level. Each of the master stations monitors whether that bit of its identification code which has just been output has a high level when the line is being discharged. If this is not the case, the master station deactivates itself and that master station whose identification code with all its bits is decisive for the successive potential states of the line manages to access the bus.

A host computer which assigns new addresses to peripheral units is described in British Patent Application GB 2 217 561 A. Here, the peripheral units simultaneously output on a bit-by-bit basis, identification numbers which are stored in them and, in doing so, carry out a collision detection. Only one of the peripheral units ultimately comes through while the others are deactivated owing to the collision detection. Subsequently, the host transmits a new address to the last peripheral unit that is still active and the unit stores the address. The unit can subsequently be addressed by the new stored address.

SUMMARY OF THE INVENTION

It is accordingly an object of the invention to provide a communications system with a master station and at least one slave station, which overcomes the above-mentioned disadvantages of the prior art devices of this general type, in which it is possible to connect any desired number of slave stations whose addresses and whose number are not known beforehand to the master station controlling them, and in which the transfer of a new address from the master station to the particular slave station is dispensed with.

With the foregoing and other objects in view there is provided, in accordance with the invention, a communications system, including: a line; a plurality of slave stations each storing an identification code formed of bits carrying one of two logic states, each of the plurality of slave stations having a first output circuit with an output terminal connected to the line, the identification code of each of the plurality of slave stations being transmitted simultaneously bit by bit to the line via a respective first output circuit, if a first logic state is simultaneously present at all of the first output circuits the line assumes a first potential, if a second logic state is present at one of the first output circuits the line assumes a second potential, the plurality of slave stations each having a monitoring means monitoring if a respectively read-out bit of a respective identification code has the second logic state in the event that the line assumes the second potential and the monitoring means deactivating a respective slave station if the respective read-out bit has the first logic state; and a master station controlling the plurality of slave stations, the master station having a master monitoring means for monitoring a potential of the line during the transmittal of the identification codes by the plurality of slave stations for registering the identification code of a last active slave station, the master station having a memory receiving and storing the identification codes so that a corresponding slave station can subsequently be addressed by the master station by the respective identification code stored in the master station.

With the foregoing and other objects in view there is also provided, in accordance with the invention, in combination with a communications system having at least one slave station and a line, a master station connected to the line and controlling an operation of the at least one slave station in the communications system, including: an address-generating means determining a potential of the line and assigning addresses to the at least one slave station, the address-generating means storing as one of the addresses each chronologically successive potential state of the line.

Whereas, in the case of the $I^2C$ bus, an identification code is stored in each master station. According to the invention there is provision for an identification code to be stored in each slave station. The identification code is different for each slave station and can have a multiplicity of bits.

Whereas, in the case of the $I^{20}C$ bus, an access authorization of competing master stations to the bus is determined by outputting their identification codes, in the case of the invention a similar procedure is used to identify any desired number of unknown slave stations by a master station. Identification is understood here to be the detection of connected slave stations and the assignment of addresses to the slave stations by the master station.

In the case of the communications system according to the invention, the master station can detect how many slave stations that have previously been unknown to it (that is to say do not have any assigned address) are connected to the system. The master station assigning to each of the slave stations an address via which it can then be addressed. The number of slave stations connected to the system is irrelevant for this.

The number of slave stations is determined by carrying out the identification according to the invention. When there is a new identification cycle (starting with the outputting of the first bit of the identification codes) the identification continues until no more slave stations signal, by outputting their identification code, that they have not yet been identified. This is the case if an address has been assigned to all the slave stations connected to the communications system and the slave stations have then been deactivated. If this case arises, the master station terminates the identification procedure.

Other features which are considered as characteristic for the invention are set forth in the appended claims.

Although the invention is illustrated and described herein as embodied in a communications system with a master station and at least one slave station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1 and 4 are block circuit diagrams of two exemplary embodiments of a communications system according to the invention;

FIG. 2 is a circuit diagram of an exemplary embodiment of a master station shown in FIG. 1;

FIGS. 6 and 7 are diagrammatic illustrations of an operating method for the communications systems shown in FIGS. 1 and 4.

DESCRIPTION OF THE PREFERRED EMBODIMENTS

Figure 3:
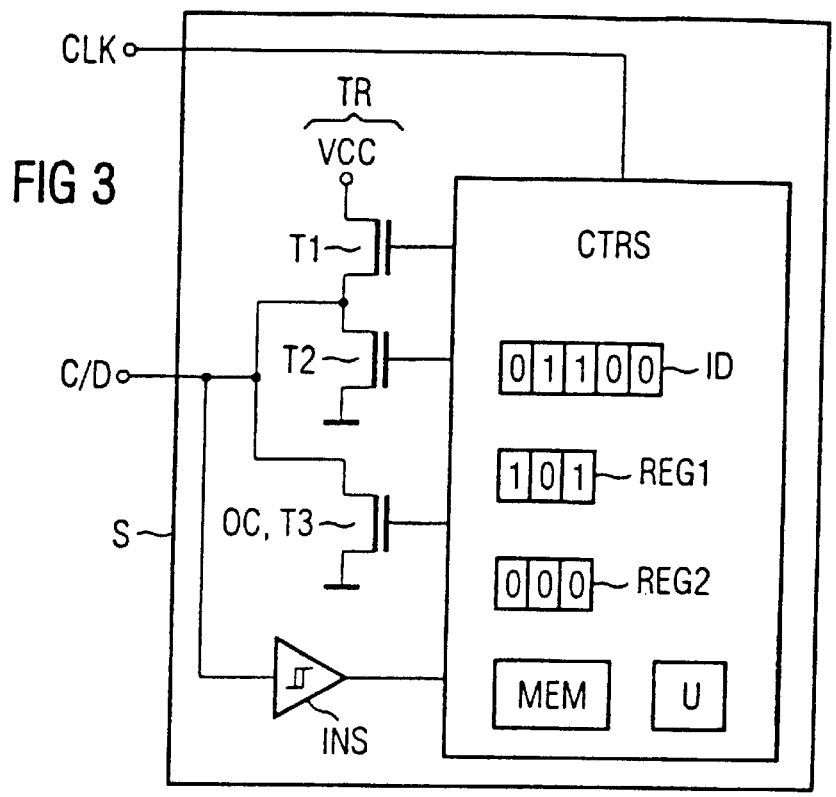
FIG. 3 is a circuit diagram of an exemplary embodiment of a slave station shown in FIG. 1.

In all the figures of the drawing, sub-features and integral parts that correspond to one another bear the same reference symbol in each case. Referring now to the figures of the drawing in detail and first, particularly, to FIG. 1 thereof, there is shown a first exemplary embodiment of a communications system. The communications system has a bus that has a clock line CLK and a command and data line C/D. Other lines which are necessary for transmitting supply potentials are not illustrated. Two slave stations S and one master station M are connected to the clock line CLK and to the command and data line C/D, the master station M being used to control the slave stations S.

FIG. 2 shows a configuration of the master station M from FIG. 1. It has a clock generating device CLKG that can be connected to the clock line CLK and generates a common operational clock for the master station M and the slave stations S. The operational clock permits synchronous operation of the stations M, S.

Furthermore, the master station M has further elements CTRM that are connected to the command and data line C/D via an output circuit OUTM and an input circuit INM. The output circuit OUTM is used to output commands and data to be stored in the slave stations, while the input circuit INM is used to receive command confirmations of the slave stations S and data transmitted by the slave stations S.

The master station M also has an address-generating device ADRG by which it can assign, during an identification process which will be explained later, addresses for later addressing to the slave stations S. It is possible to transmit the addresses to the slave stations S likewise via the output circuit OUTM and the command and data line C/D in certain circumstances, as will be described below.

The command and data line C/D is connected via a resistor R (in this case a pull-up resistor) to a first potential VCC that is a supply potential of the master station M. In the exemplary embodiment of the invention, the resistor R is disposed within the master station M. It can however also be disposed outside the latter. The resistor R is deactivated by a switch S.

Each of the slave stations S of the communications system in FIG. 1 is constructed according to FIG. 3. Each slave station S is connected to the command and data line C/D via a first output circuit OC (an open-drain output circuit) and a second output circuit TR (a tri-state output circuit for a push-pull mode) which are connected to one another on the output side. The second output circuit TR has a first transistor T1 and a second transistor T2. The first output circuit OC has a third transistor T3. The first output circuit OC can, of course, also be realized as an open-collector output with a bipolar transistor.

The slave station S in FIG. 3 has components CTRS to which the operational clock generated by the master station M can be fed via the clock line CLK. The slave station S is connected to the command and data line C/D via an input circuit INS. The input circuit INS is used to receive an address which is assigned to the slave station S by the master station M, and commands and data that is transmitted by the master station M.

In the slave station S, an identification code ID is stored which is different for all the slave stations S connected to the communications system. The identification code ID can be output bit by bit to the command and data line C/D via the first output circuit OC. This can take place simultaneously for all the slave stations S, specifically in synchronism with the operational clock CLK.

The slave station S also has a memory REG1 (a RAM) which can be written to and in which an address transmitted by the master station M can be stored. In addition, the slave station S has a read-only memory REG2 (a ROM) in which an initialization address which is identical for all the slave stations S is permanently stored. Furthermore, the slave station S contains a monitoring device U by which, when the identification code ID is output via the first output circuit OC, the individual bits of the identification code ID can be compared with the potential of the command and data line C/D.

The slave station S also contains a data memory MEM in which data transferred via the command and data line C/D can be stored and can be output again via the second output circuit TR. The data memory MEM can be a RAM or a ROM.

The method of operation of the communications system components described above with reference to FIGS. 1–3 will now be explained below.

The communications system, and with it the slave stations S, can be placed in two different operating modes by the master station M. In the first operating mode, the slave stations S that are connected to the communications system are identified by the master station M which assigns to the identified slave stations S addresses for later individual addressing. In the second operating mode, individual slave stations S can be addressed by the master station M using the addresses and the data which is stored, or is to be stored, in the data memory MEM and is transferred between the addressed slave station S and the master station M.

While the second output circuits OC of all the slave stations S can be activated in the first operating mode, in the second operating mode in each case only the second output circuit TR of the individual slave stations S which are respectively addressed can be activated.

When the communications system is activated, all the slave stations S are firstly placed in the first operating mode.

In response to a command of the master station M, which addresses all the slave stations S using the initialization address which is stored in the read-only memory REG2 and is identical for all the slave stations S, all the slave stations S simultaneously transmit bit by bit their identification codes, via their first output circuit OC, to the command and data line C/D that is firstly pre-charged to the first potential VCC.

The first output circuits OC are in a state with higher impedance (third transistor T3 is disabled or non-conducting) when an item of data of a first logic state 0 is output than when an item of data of a second logic state 1 is output (third transistor T3 is conductive). Since the command and data line C/D is pre-charged to the first potential VCC, the first potential VCC is maintained on the line C/D, provided the first logic state 0 is present at all the first output circuits OC. If, in contrast, the second logic state 1 is present at the first output circuit OC at only one of the slave stations S, the potential of the line C/D is discharged to earth via the corresponding third transistor T3 until only bits of the first logic state 0 are present again at the first output circuits OC.

While all the slave stations S output their identification codes ID, they monitor the potential of the line C/D by the monitoring devices U. The slave stations S which output bits of the first logic state 0, but detect that the line C/D is nevertheless discharged, deactivate themselves. Then only those slave stations S that are currently outputting a bit of the second logic state 1 remain active. After all the bits of the identification codes ID have been output, there is consequently only one of the slave stations S still active, since all the identification codes ID are different.

Since the number of bits of the identification codes ID is known and the bit-by-bit outputting takes place in synchronism with the operational clock CLK, the master station M knows when all the bits have been output. At this time, it assigns an address for later addressing to the last slave station S still active by its address-generating device ADRG. There are two possibilities for this address assignment:

1. The master station M generates an individual address by its address-generating device ADRG and transmits the address via the command and data line C/D to the still active slave station S where it is stored in the memory REG1 of the slave station which can be written to; and
2. As an alternative to this, the master station M observes, during the identification process (outputting of the identification codes ID) just described, the potential on the line C/D and reconstructs from it the identification code of the last slave station S still active, which identification code it stores in the address-generating device ADRG for later addressing of the slave station S using this identification code ID. The address which is assigned to the slave station S is then identical to its identification code ID determined by the master station M. The advantage of this variant consists in the fact that a memory REG1 which can be written to is not required in the slave stations S nor is there any need for transfer of an address which has been newly assigned to the stations.

The first-mentioned alternative provides the major advantage that the slave station S can be assigned a new address that has substantially fewer bits than its identification code ID. Also, the master station M does not need to have any way for detecting the identification codes ID output by the slave stations S. Since all the identification codes ID are to be different and they are stored in the read-only memory REG2, for example during the process of manufacturing the slave stations S, while the later place of use is still unknown, a large number of fabricated slave stations S require the provision of a large number of bits of the identification codes ID. On the other hand, in a communications system there will always be a limited number of subscribers, so that individual addressing of all the slave stations S is possible even with a small number of bits. The advantage of a smaller number of address bits is that the addressing procedures, which take the form of the transfer of address bits from the master station M to the slave stations S in the second operating mode, can be substantially shortened. There may be provision, for example, for the identification codes ID each to have 128 bits and for the assigned addresses to have only 32 bits.

In order to be able to identify more than one of the slave stations S and to be able to assign an address to each of them, the method which has been explained is repeated in connection with the slave stations S which have not yet been identified, while the slave stations S which have already been identified remain deactivated. In this way, after n identification cycles, during which in each case the identification codes ID are output bit by bit in the manner described, n slave stations S can be identified.

By virtue of the fact that, in order to carry out the first operating mode, the identification of the slave stations S by the master station, the first output circuits OC are provided as open-drain output circuits, there arises the favorable possibility of connecting all the slave stations S in parallel, as is necessary for the identification according to the invention. However, the switching behavior of such open-drain outputs is relatively slow. The use of the second output circuit TR as a tri-state output, which can be switched more quickly in comparison with the latter, in order to carry out the second operating mode, the transfer of data from one of the slave stations S to the master station M, advantageously permits a much higher data rate than would be possible using the first output circuit OC, also in the second operating mode.

In order to set the two different data rates, the clock that is generated on the clock line CLK by the clock generator CLKG of the master station M can be set to two different values, namely a lower clock rate for the first operating mode in which the first output circuits OC are actuated, and a higher clock rate for the second operating mode in which the data stored in the data memories MEM can be transmitted via the corresponding second output circuits TR.

The command and data line C/D in FIG. 1 is used, in the first operating mode (identification), to transfer the identification command of the master station M to all the slave stations S addressed via the initialization address stored in the read-only memory REG2, to output the identification codes ID of the slave stations S via the first output circuits OC and, if appropriate, to transmit the assigned addresses from the master station M to the respective slave station S. In the second operating mode (transfer of data), to transfer commands of the master station M to individual slave stations S by the newly assigned addresses stored in the memory REG1 which can be written to, to transmit data which can be, or is, stored in the addressed slave stations S, between the master station M and the respectively addressed slave station S as well as to transfer possibly provided command confirmations by the slave stations S as a response to commands of the master station M.

By virtue of using the second output circuits TR in the second operating mode, the transfer of data as well as the confirmation of the commands can be effected at a higher data rate than if the first output circuits OC were also used for this. This follows from the higher data rate that can be reached for tri-state output circuits in comparison with open-drain output circuits. This is achieved in that the operational clock on the clock line CLK is increased in the second operating mode in comparison with the first operating mode.

It is particularly advantageous that the resistor R for pre-charging the line C/D (see FIG. 2) can be deactivated via the switch S in the second operating mode. The switch S is closed only in the first operating mode, since the pre-charging is necessary only for the parallel operation of the first output circuits OC. In contrast, the second output circuits TR can be operated at a maximum data rate if the switch S is open in the second operating mode.

Figure 4:
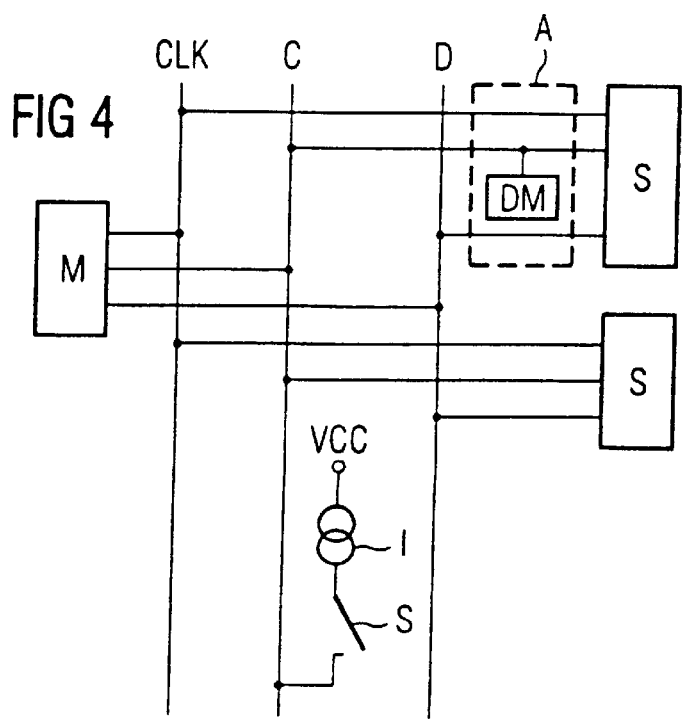

FIG. 4 shows a second exemplary embodiment of the communications system according to the invention. The latter has a bus including three lines: the clock line CLK as well as a command line C and a data line D which are provided instead of the command and data line C/D shown in FIG. 1. Data stored in the data memory MEM of the slave stations S is transmitted via the data line D, while the commands and command confirmations are exchanged between the master station M and the slave stations S via the command line C. Furthermore, the identification according to the invention takes place via the command line C.

The command line C can be pre-charged to the first potential VCC via a current source I that can be deactivated by a switch S and can be realized for example by a transistor. With such a current source I, the discharging procedure of the command line C can be made quicker in the first operating mode (identification) than when a resistor R, as illustrated in FIG. 1, is used. The current source I can, of course, also be a component of the master station M. The possibility of deactivating the current source I, as is described in connection with the resistor R in FIG. 2, enables the recharging times of the line C in the second operating mode (use of the second output circuits TR) to be reduced, so that the maximum data rate which can be achieved with the second output circuits TR is further increased.

The master station M in FIG. 4 can be made similar to that in FIG. 2, it being, of course, necessary to provide separate connections for the data line D and the command line C. The transfer of the assigned addresses to the slave stations S is effected via the command line C.

Figure 5:
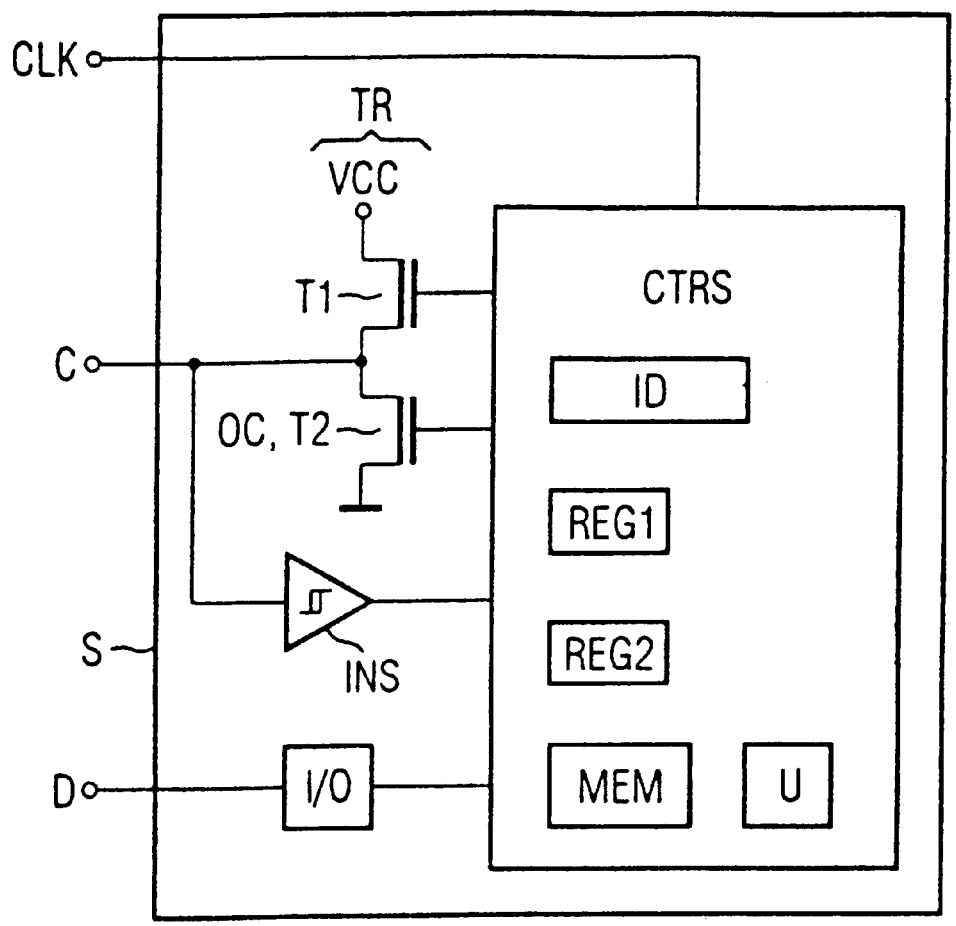
FIG. 5 is a circuit diagram of an exemplary embodiment of the slave station shown in FIG. 4.

FIG. 5 shows one of the slave stations S from FIG. 4 which differs from the exemplary embodiment illustrated in FIG. 3 only in terms of the below listed points.

For the connection to the data line D there is an input and output circuit I/O via which data can be read into and out of the data memory MEM. Appropriately, the input and output circuit I/O can also have a tri-state output for ensuring a high data rate.

The first OC and second TR output circuits of the slave stations S are, as in the exemplary embodiment according to FIG. 3, again open-drain or tri-state output circuits and are connected on the output side to the command line C. The first output circuit OC is, in this exemplary embodiment, part of the second output circuit TR that is formed by the first transistor T1 and the second transistor T2. The first output circuit OC is formed by the second transistor T2 of the second output circuit TR. The second output circuit TR can be controlled via the gates of the two transistors T1, T2 and, in this way, it can transmit one of the two logic states 0, 1 at its output or switch the latter to a high-impedance state. On the other hand, the first output circuit can be controlled via the gate of the second transistor T2, provided that the control signal of the first transistor T1 remains deactivated, so that the latter becomes disabled.

In the communications system illustrated in FIG. 4, the command line C is used exclusively to transfer commands of the master station M to the slave stations S, and command confirmations in the opposite direction. The inventive switching over from operating the first output circuits OC in the first operating mode (identification) to operating the second output circuits TR in the second operating mode (transfer of data) permits the commands received by the slave stations S to be confirmed at a high data rate in the second operating mode. The reason for this is, as already mentioned, the higher switching speed that can be reached by tri-state output circuits in comparison with open-drain/collector output circuits. Since the communications system, and thus also the slave stations S, operate in synchronism with the operational clock CLK, the data rate of all the output circuits OC, TR, I/O is likewise determined by the clock CLK.

Overall, with this embodiment of the invention, as also in the exemplary embodiment according to FIG. 1, a high data rate for operation in the second operating mode is obtained, since, in the second operating mode, a higher rate of the clock on the clock line CLK is provided than in the first operating mode. The clock CLK is in fact used in FIG. 1 to synchronize the operation of the command and data line C/D and is used in FIG. 4 to synchronize the operation both of the command line C and of the data line D.

Since the identification in the first operating mode always takes only a relatively short time, the communications system is almost always in the second operating mode and is able to profit from the higher clock rate which the use of tri-state output circuits both as second output circuits TR and within the input and output circuit I/O (in the exemplary embodiment in FIG. 5) makes possible.

FIG. 4 additionally shows as an example of the slave station S illustrated in the upper region that the latter is connected via a connecting device A to the lines CLK, C, D of the communications system. The connecting device A can be for example a module slot for the slave station S. It is then possible for the system to have a series of such connecting devices A, not all of which have to be connected to slave stations S when the system is operating. The connecting device A in FIG. 4 has a detection device DM which is used to detect the connection of the slave station S to the connecting device A. The detection can be realized for example by a mechanical or electric switch that is activated when the slave station S is connected to the connecting device A. After it has detected the connection of a slave station S, the detection device DM transfers an appropriate result signal to the master station M. In the exemplary embodiment shown, this result signal is transmitted via the command line C.

The described detection device DM makes it possible to inform the master station M if new slave stations S, which have previously not been identified or provided with an address, are connected to the communications system. This is particularly favorable if the number of connected slave stations S increases while the communications system is operating as a result of the addition of further slave stations S. The master station M can then deactivate the already previously identified slave stations S, after which the one or more newly added slave stations S which have not yet been assigned an address by the master station M are identified in the manner already described.

An advantageous way of operating the communications systems shown in FIGS. 1 and 4 is now explained with reference to an exemplary embodiment and to FIGS. 6 and 7.

Figure 6:
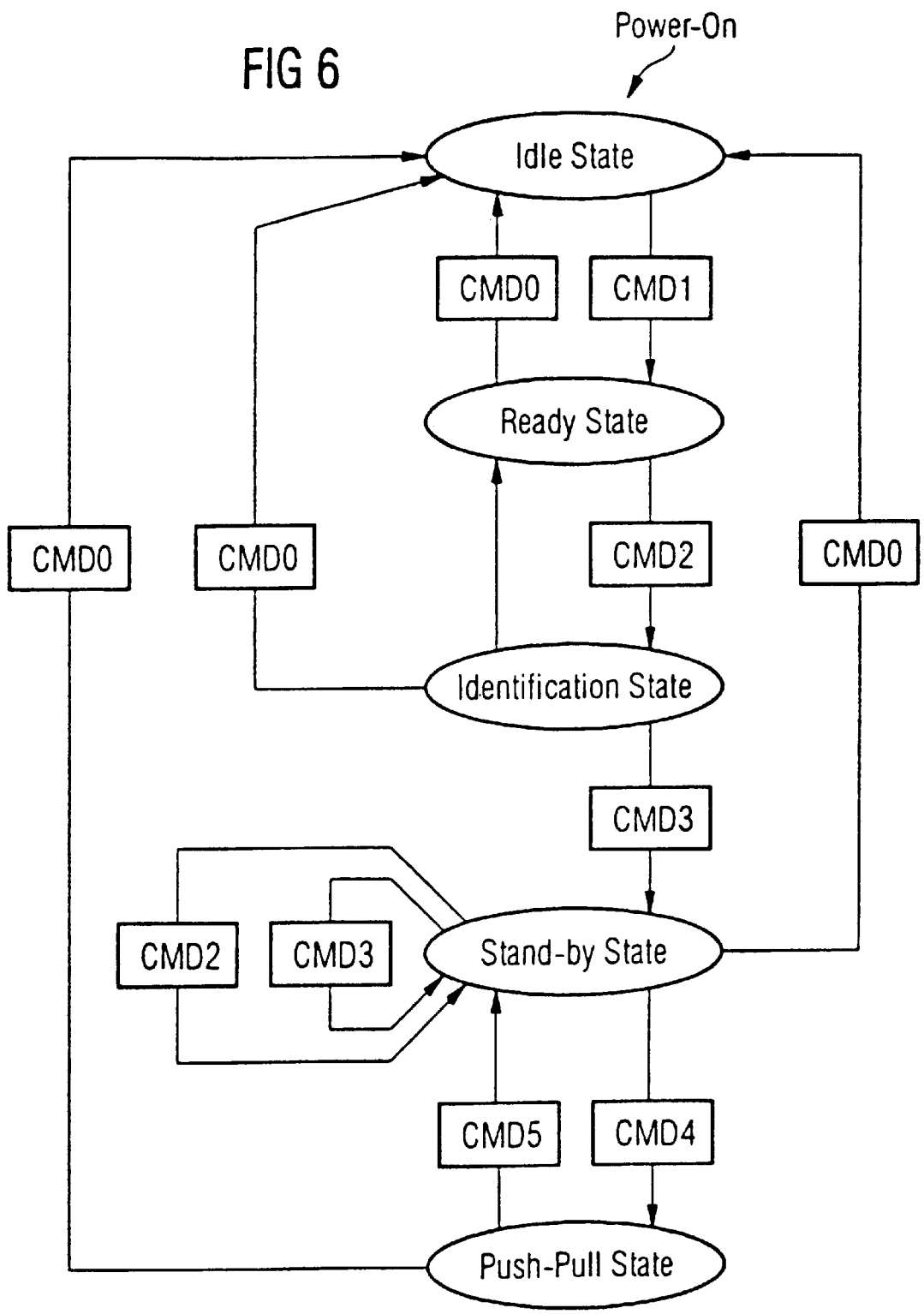

At the very top of FIG. 6 it is illustrated that when the communications system is activated, that is to say when the supply voltage is applied (power-on), all of the slave stations S are initially in an idle state. All the slave stations S can be placed in the idle state at any time by a reset command CMD0 of the master station M while the communications system is operating.

When the communications system is activated, the slave stations S can be addressed by the master station M using the address that is stored in the read-only memory REG2 and is identical for all slave stations S. With a first command CMD1, the master station M places the slave stations S in a ready state in which the open-drain output circuits OC are ready for operation.

With a second command CMD2 of the master station M (the identification command), the slave stations S can then be placed in an identification state which corresponds to the first operating mode described above. In this identification state, the bit-by-bit outputting of the identification codes ID is effected via the first output circuits OC.

An assigned address is transferred by a third command CMD3 to that slave station S that prevailed during the identification and it is subsequently placed in a stand-by state. In this stand-by state it no longer reacts to the commands CMD2 and CMD3.

After this one identification cycle has been carried out, the slave stations S which have not yet been identified are in the ready state again, after which the identification of the next slave station S is initiated by the second command CMD2.

When all the slave stations S have been identified, they can be changed by a fourth command CMD4 from the stand-by state to a state (push-pull state) in which the open-drain output circuits OC are deactivated and the tri-state output circuits TR are held ready for operation.

If an additional slave station S is connected to the communications system, the master station M can be informed of this, as has been explained in connection with FIG. 4, by the detection device DM. The master station M can return the slave stations S which are in the push-pull state and which, of course, have already been identified, to the stand-by state by a fifth command CMD5. The at least one slave station S, which has been newly connected to the system, is in the idle state as the result of it being supplied with the supply voltage for the first time. Using the commands CMD1, CMD2 and CMD3, the identification procedure already described can be carried out for this slave station or stations S.

FIG. 7 illustrates the already explained idle state, push-pull state and stand-by state of the slave stations S. The further operating states of the communications system will now be explained.

Starting from the push-pull state, in each case one of the slave stations S can be placed in a transfer state by the individual address which is assigned to it by the master station M in the identification state by the third command CMD3. At this time, a point-to-point connection is set up between the slave station S and the master station M. In the transfer state, the slave station S confirms (acknowledges) every command of the master station M. Using a ninth command CMD9, the slave station S is requested by the master station M to transfer to the master station M specific data stored in the slave station S. The specific data may be for example the capacity of the data memory MEM, the type of error correction code to be used for the data stored in the data memory MEM as well as the maximum possible clock rate which is acceptable for the operational clock for operating the slave circuit S.

With an eleventh command CMD11, the master station M can request the addressed slave station S which is in the transfer state to transfer to it data which is stored in the data memory MEM via the command and data line C/D (FIG. 1) and via the data line D, respectively, (FIG. 4). With the eleventh command CMD11, a start address is transferred within the data memory MEM to the slave station S starting from which data is to be read out. The transfer of data takes place until the slave station S receives a stop command CMD12 or renews the eleventh command CMD11 which informs it of a new start address for reading data out of the data memory MEM.

The fifth command CMD5 is used not only for changing slave stations S which are in the push-pull state into the stand-by state, as explained with reference to FIG. 6, but also for changing a slave station S which may be in the transfer state into the stand-by state, as is shown in FIG. 7.

Furthermore, in the exemplary embodiment illustrated in FIGS. 6 and 7, there is advantageous provision, provided that only one slave station S can be, or is, connected to the communications system, to change the slave station S directly from the idle state into the transfer state by a sixth command CMD6. This single slave station S can be addressed by the master station M using the address which is permanently stored in the read-only memory REG2, without the slave station S having to be identified, accompanied by the allocation of a new address, using the commands CMD1, CMD2 and CMD3. In this way, in such a communications system where there is only one slave station S present, operation in the first operating mode, in which the first output circuits OC are activated, is dispensed with and the slave station S is operated exclusively in the second operating mode (corresponding to the transfer state). This results advantageously in a large time saving in terms of the actuation of the individual slave stations S.

The slave stations s may be, for example, data media in the form of cards and the master station m may be an appropriate write/read device or playback device.

We claim:

1. A communications system, comprising:
a line;
an element for placing a first potential on said line;
a plurality of slave stations each storing an identification code formed of bits carrying one of two logic states, each of said plurality of slave stations having an output circuit with an output terminal connected to said line, each said output circuit controlled to transmit the identification code of a respective slave station bit by bit onto said line simultaneously with transmitted identification codes of others of said plurality of slave stations, each said output circuit configured such that said line remains at said first potential if each said output circuit of said slave stations is simultaneously transmitting a first logic state, each said output circuit configured such that if one or more of said output circuits transmits a second logic state while other said output circuits are transmitting the first logic state, then the output circuit of said one or more slave stations switches said line to a second potential, each particular said slave station having monitoring means monitoring whether the transmitted bit of the identification code of said particular slave station is of the second logic state when said line has said second potential and said monitoring means deactivating said particular slave station if the transmitted bit of said particular slave station has the first logic state; and
a master station controlling said plurality of slave stations, said master station having a master monitoring means for monitoring a potential of said line during the transmission of the identification codes by said plurality of slave stations for registering the identification code of a last active slave station, said master station having a memory receiving and storing the identification codes so that a corresponding slave station can subsequently be addressed by said master station by the respective identification code stored in said master station.

2. A communications system, comprising:

a line;

an element for placing a first potential on said line;

a plurality of slave stations each storing an identification code formed of bits carrying one of two logic states, each of said plurality of slave stations having an output circuit with an output terminal connected to said line, each said output circuit controlled to transmit the identification code of a respective slave station bit by bit onto said line simultaneously with transmitted identification codes of others of said plurality of slave stations, each said output circuit configured such that said line remains at said first potential if each said output circuit of said slave stations is simultaneously transmitting a first logic state, each said output circuit configured such that if one or more of said output circuits transmits a second logic state while other said output circuits are transmitting the first logic state, then the output circuit of said one or more slave stations switches said line to a second potential, each particular said slave station having monitoring means monitoring whether the transmitted bit of the identification code of said particular slave station is of the second logic state when said line has said second potential and said monitoring means deactivating said particular slave station if the transmitted bit of said particular slave station has the first logic state; and a master station controlling said plurality of slave stations, said master station having a master monitoring device for monitoring a potential of said line during the transmission of the identification codes by said plurality of slave stations for registering the identification code of a last active slave station, said master station having a memory receiving and storing the identification codes so that a corresponding slave station can subsequently be addressed by said master station by the respective identification code stored in said master station.

* * * * *